US012645532B2

(12) United States Patent
Villa et al.

(10) Patent No.: US 12,645,532 B2
(45) Date of Patent: Jun. 2, 2026

(54) MEMORY APPARATUS CONFIGURED WITH SCRUBBING OR REFRESHING OPERATIONS TO PRESERVE INTEGRITY OF STORED DATA AND METHOD FOR OPERATING THE SAME

(71) Applicant: Micron Technology, Inc., Boise, ID (US)

(72) Inventors: Corrado Villa, Sovico (IT); Graziano Mirichigni, Vimercate (IT); Ferdinando Bedeschi, Biassono (IT)

(73) Assignee: Micron Technology, Inc., Boise, ID (US)

( * ) Notice: Subject to any disclaimer, the term of this patent is extended or adjusted under 35 U.S.C. 154(b) by 300 days.

(21) Appl. No.: 17/479,798

(22) Filed: Sep. 20, 2021

(65) Prior Publication Data

US 2022/0091933 A1     Mar. 24, 2022

Related U.S. Application Data

(63) Continuation of application No. PCT/IB2020/020055, filed on Sep. 21, 2020.

(51) Int. Cl.
| | |
|---|---|
| *G06F 11/00* | (2006.01) |
| *G06F 11/10* | (2006.01) |
| *G06F 12/16* | (2006.01) |

(52) U.S. Cl.
CPC ........ *G06F 11/106* (2013.01); *G06F 11/1068* (2013.01); *G06F 12/16* (2013.01); *G06F 11/1044* (2013.01); *G06F 11/1048* (2013.01)

(58) Field of Classification Search
CPC .............. G06F 11/106; G06F 11/1068; G06F 11/1044; G06F 11/1048; G06F 12/16
See application file for complete search history.

(56) References Cited

U.S. PATENT DOCUMENTS

| | | | | |
|---|---|---|---|---|
| 5,469,558 | A * | 11/1995 | Lieberman | .............. G06F 13/28 711/119 |
| 7,573,773 | B2 | 8/2009 | Lin | |
| 9,600,362 | B2 | 3/2017 | Kang et al. | |
| 10,049,006 | B2 * | 8/2018 | Reed | ..................... G06F 3/0619 |
| 10,803,919 | B2 | 10/2020 | Kim et al. | |
| 2003/0191888 | A1 * | 10/2003 | Klein | ................. G11C 11/4076 711/105 |
| 2005/0022065 | A1 * | 1/2005 | Dixon | ................. G11C 29/848 714/42 |
| 2008/0239808 | A1 * | 10/2008 | Lin | .................... G11C 16/3431 365/222 |
| 2011/0055468 | A1 * | 3/2011 | Gonzalez | ........... G06F 11/1068 711/E12.001 |
| 2012/0246544 | A1 | 9/2012 | Resnick et al. | |

(Continued)

OTHER PUBLICATIONS

International Search Report and Written Opinion, PCT/IB2020/020055, mailed on Jun. 15, 2021.

*Primary Examiner* — Elmira Mehrmanesh
(74) *Attorney, Agent, or Firm* — Greenberg Traurig

(57) ABSTRACT

A memory apparatus and a method for operating the same. The method includes performing a read operation on a set of memory cells, detecting an error in data read from the set of memory cells based on an error correction code (ECC) operation performed on the data, and performing a scrubbing operation or a refreshing operation on the set of memory cells according to a detecting result.

21 Claims, 9 Drawing Sheets

(56)         References Cited

U.S. PATENT DOCUMENTS

| | | | |
|---|---|---|---|
| 2014/0059405 A1* | 2/2014 | Syu | G11C 16/04 |
| | | | 711/E12.008 |
| 2015/0085575 A1* | 3/2015 | Tam | G11C 29/50004 |
| | | | 365/185.11 |
| 2017/0269979 A1* | 9/2017 | Gollub | G06F 11/076 |
| 2017/0344299 A1* | 11/2017 | Ivanov | B60W 30/09 |
| 2018/0314591 A1 | 11/2018 | Reed et al. | |
| 2019/0114078 A1* | 4/2019 | Oh | G06F 3/0632 |
| 2019/0188072 A1* | 6/2019 | Kim | G06F 11/104 |
| 2020/0210278 A1* | 7/2020 | Rooney | G06F 11/1004 |
| 2020/0387323 A1* | 12/2020 | Boehm | G06F 11/106 |
| 2021/0057022 A1* | 2/2021 | Jenkinson | G11C 11/4087 |

* cited by examiner

500

START

S510    performing a read operation on a set of memory cells

S530    detecting an error in data read from the set of memory cells based on an error correction code (ECC) operation performed on the data S550    performing a scrubbing operation or a refreshing operation on the set of memory cells according to a detecting result

END

MEMORY APPARATUS CONFIGURED WITH SCRUBBING OR REFRESHING OPERATIONS TO PRESERVE INTEGRITY OF STORED DATA AND METHOD FOR OPERATING THE SAME

CROSS-REFERENCE TO RELATED APPLICATION

The present application is a continuation application of International Patent Application No. PCT/IB2020/020055, filed on Sep. 21, 2020, and entitled "MEMORY APPARA-TUS AND METHOD FOR OPERATING THE SAME," the entire disclosure of which application is hereby incorporated herein by reference.

TECHNICAL FIELD

The present disclosure relates to a field of electronics, and more specifically to a memory apparatus and a method for operating the same.

BACKGROUND ART

Memory devices are widely used to store information in various electronic devices such as computers, wireless communication devices, cameras, digital displays, and the like. Information is stored by programing different states of a memory device. For example, binary devices have two states, often denoted by a logic "1" or a logic "0". In other systems, more than two states may be stored. To access the stored information, a component of the electronic device may read, or sense, the stored state in the memory device. To store information, a component of the electronic device may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory cells may maintain their stored logic state for extended periods of time even in the absence of an external power source. Volatile memory cells may lose their stored state over time unless they are periodically refreshed by an external power source.

Memory resources have innumerable applications in electronic devices and other computing environments. Continued drive to smaller and more energy efficient devices has resulted in scaling issues with traditional memory devices. Thus, there is a current demand for memory devices that can potentially scale smaller than traditional memory devices. However, some memory technologies that scale smaller than traditional devices can experience relatively high rates of errors. Computing systems typically implement error detection and correction mechanisms to handle errors and prevent system crashes, loss of information, or both. However, error correction mechanisms can increase system cost, occupy space on a die, and increase the amount of time for accurate retrieval of data from memory. Such drawbacks can be especially significant for larger or more complex error correcting systems used for memories with high error rates. In addition, a RBER (Raw Bit Error Rate) may increase after reading many times a same memory page of the memory device, which may also increase the read error rate.

The present disclosure relates to improvements of memory read, for example, a self-controlled refresh of the memory, in order to keep the RBER under a level that guarantees that a read operation is always performed with no errors, or a number of errors correctable by an embedded error correction code (ECC).

DETAILED DESCRIPTION

Figure 1:
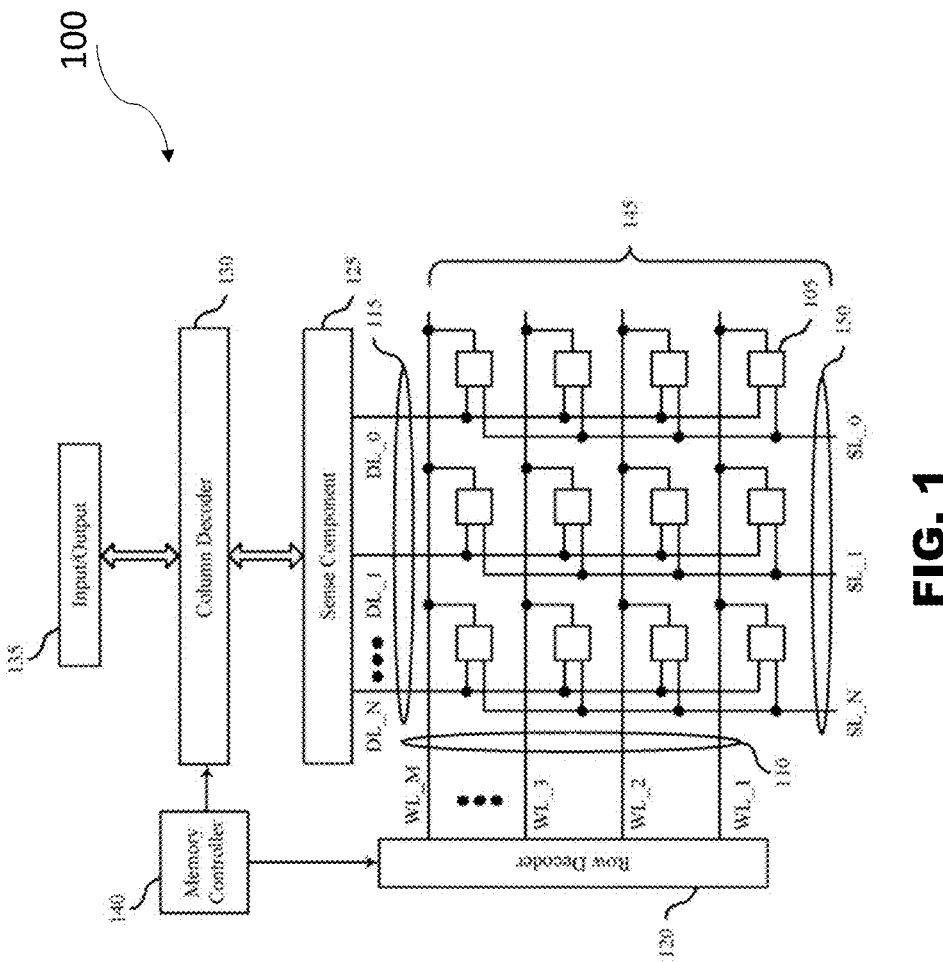
FIG. 1 is a diagram of an example memory component that supports the self-controlled refresh in accordance with an embodiment of the present disclosure.

The following description includes discussion of figures having illustrations given by way of example of implementations of embodiments of the disclosure. The drawings should be understood by way of example, and not by way of limitation. As used herein, references to one or more "embodiments" are to be understood as describing at least one implementation of the disclosure that includes one or more particular features, structures, or characteristics. Thus, phrases such as "in one embodiment" or "in an alternate embodiment" appearing herein describe various embodiments and implementations of the disclosure, and do not necessarily all refer to the same embodiment. However, they are also not necessarily mutually exclusive.

An error in memory may be detected and indicated to a device. The error may be detected using an error correction code (ECC). Upon detection of the error, the memory may be scrubbed to correct the error. When there is no error detected in the memory, a pseudo-random refresh operation may be performed on the memory to prevent a future read error. Memory scrubbing may comprise reading the memory, correcting any possible error (for example using an ECC) and reprogramming the memory with the correct data. Memory refreshing may comprise reinforcing the data read from the memory.

Memory cells within a memory array may be used to store data and information. Each memory cell may be used to store one bit of data, for example, which may be represented by the state of the memory cell. For instance, a first state of a memory cell may represent a first binary value (e.g., a logic 0) and a second state of the memory cell may represent a second binary value (e.g., a logic 1). To increase speed, memory cells may be written to, and read from, in sets. When a set of data is written to a set of memory cells, an ECC may be used so that errors are detectable when the memory cell is read.

In one embodiment of the present disclosure, a scrubbing operation or a refreshing operation may be performed on the set of memory cells according to the detecting result. In one embodiment of the present disclosure, the scrubbing operation may be performed on the set of memory cells when the error is detected. In an alternate embodiment of the present disclosure, the refreshing operation may be performed on the set of memory cells when no error is detected.

In one embodiment of the present disclosure, the set of memory cells may be scrubbed to correct the error detected in the set of memory cells. In one embodiment of the present disclosure, an error threshold at which the set of memory cells is actually scrubbed is selectable based on a margin desired with respect to a correction power of an ECC engine performing the ECC operation. In one embodiment of the present disclosure, when there is no error detected in the set of memory cells, the set of memory cells may be blindly refreshed on a pseudo-random basis to prevent a future read error on the same set of memory cells.

The operations mentioned above may be termed as self-controlled refresh operations, which can advantageously guarantee a low latency in read, offer a sustainable read bandwidth matching write bandwidth, require some time to perform the scrubbing or refreshing operation on the location just accessed, and consume the power occasionally, and further allow to maintain a low RBER of read. Features of the disclosure introduced above are further described below in the context of a memory component. Specific examples are then described for self-controlled refresh. These and other features of the disclosure are further illustrated by and described with reference to apparatus diagrams, system diagrams, and flowcharts that relate to the self-controlled refresh.

FIG. 1 illustrates an example memory component 100 that supports self-controlled refresh in accordance with various embodiments of the present disclosure. Memory component 100 may also be referred to as an electronic memory apparatus. Memory component 100 includes memory array 145, which includes rows and columns of memory cells 105 that are programmable to store different states. Each memory cell 105 may be programmable to store two states, denoted as a logic 0 and a logic 1 (e.g., the memory cells 105 may be single level cells (SLCs)). That is, each memory cell 105 may store a bit of information. In some cases, a memory cell 105 is configured to store more than two logic states (e.g., the memory cells 105 may be multi-level cells (MLCs)). A memory cell 105 may include a floating gate transistor (e.g., a MOSFET) to store a charge representative of the programmable states; for example, a charged and uncharged floating gate transistor may represent two logic states, respectively. Different levels of charge on a floating gate transistor may represent different logic states. In other cases, a memory cell 105 may include a charge trap transistor to store charge in a gate dielectric to represent one or more programmable states.

Source lines 150 may be connected to a common voltage (e.g., common ground or 0 V). Digit lines 115, which may also be referred to as bit lines, may serve as data buses for access operations (e.g., read operations) of memory cells 105. Operations such as reading and writing (e.g., programming and erasing) may be performed on memory cells 105 by activating or selecting the appropriate word line 110, which may also be referred to as an access line, and digit line 115. Activating or selecting a word line 110 or digit line 115 may include applying a biasing voltage to the respective line. Thus, the voltage combination applied to the word line 110 and digit line 115 of a memory cell 105 may define the access operation (e.g., whether it is read or write (erase or program) operation).

Word lines 110, source lines 150, and digit lines 115 are made of conductive materials. For example, word lines 110, source lines 150, and digit lines 115 may be made of metals (such as copper, aluminum, gold, tungsten, etc.), metal alloys, other conductive materials, or the like. According to the example of FIG. 1, each row of memory cells 105 in memory array 145 is connected to a single word line 110, and each column of memory cells 105 is connected to a single digit line 115; however, the memory cells 105 may be arranged in other configurations. By activating (e.g., appropriately biasing) one word line 110 and one digit line 115, a set of memory cells 105 (e.g., a byte of data corresponding to logic values stored in several memory cells 105) may be accessed. Accessing memory cells 105 may include reading or writing (e.g., programming or erasing) memory cells 105. In some cases, the intersection of a word line 110 and digit line 115 may be referred to as an address of a memory cell. The memory may be addressable (e.g., accessible) at a byte-level.

Accessing memory cells 105 may be controlled through a row decoder 120 and a column decoder 130. In some examples, a row decoder 120 receives a row address from the memory controller 140 and activates the appropriate word line 110 based on the received row address. Similarly, a column decoder 130 receives a column address from the memory controller 140 and activates the appropriate digit line 115. For example, memory array 145 may include multiple word lines 110, labeled WL_1 through WL_M, and multiple digit lines 115, labeled DL 1 through DL N, where M and N depend on the array size. Thus, by appropriating biasing a word line 110 and a digit line 115 (e.g., WL_2 and DL 3) the memory cell 105 at their intersection may be accessed.

Upon accessing, a memory cell 105 may be read, or sensed, by sense component 125 to determine the stored state of the memory cell 105. For example, current flowing through the memory cell 105, as dictated by the charge on the floating gate of the memory cell 105, may transfer onto the corresponding digit line 115. The current flowing through the memory cell 105 may be based on biasing (e.g., applying a voltage) to the control gate of the memory cell 105 (e.g., via the corresponding word line 110). The current flowing through the memory cell 105 may be compared to a reference current (not shown) in order to determine the stored state of the memory cell 105. For example, if a digit line 115 has a higher current than the reference current, then sense component 125 may determine that the stored state in memory cell 105 was a logic 1 and vice versa. In some cases, the current may be converted into a voltage that is compared to a reference voltage to determine the logic state of the memory cell 105. Sense component 125 may include various transistors or amplifiers in order to detect and amplify a difference in the signals, which may be referred to as latching. The detected logic state of memory cell 105 may then be output through column decoder 130 as output 135.

A memory cell 105 may be written (e.g., programmed or erased) by biasing the relevant word line 110 and digit line 115. In some cases, activating a word line 110 may bias the digit lines 115 of the corresponding memory cells 105. By biasing the relevant digit line 115 while the word line 110 is activated, a memory cell 105 may be written—i.e., a logic value (e.g., a bit of data) may be stored in the memory cell 105. Column decoder 130 may accept data, for example input 135, to be written to the memory cells 105. A floating gate transistor memory cell 105 may be written by applying a voltage across the floating gate transistor. This process is discussed in more detail below. In some cases, a string or block of data may be stored in memory array 145 by writing to a set of memory cells 105. In such cases, an ECC code may be used during the write operation to enable error detection during a subsequent read operation. According to the techniques described herein, an error in data read from the set of memory cells 105 may be detected based on an ECC operation performed on the data. A scrubbing operation or a refreshing operation may be performed on the set of memory cells 105 according to a detecting result. In one embodiment of the present disclosure, the scrubbing operation may be performed on the set of memory cells 105 when the error is detected. Memory scrubbing may comprise reading the memory, correcting any possible error (for example using an ECC) and reprogramming the memory with the correct data. In an alternate embodiment of the present disclosure, the refreshing operation may be performed on the set of memory cells 105 when no error is detected. Refreshing may comprise reinforcing the data read from the memory.

The memory controller 140 may control the operation (e.g., read, program, erase, scrubbing, refreshing, etc.) of memory cells 105 through the various components, such as row decoder 120, column decoder 130, sense component 125, a scrubbing module (not shown), and a refreshing module (not shown). Memory controller 140 may generate row and column address signals in order to bias the desired word line 110 and digit line 115. Memory controller 140 may also generate and control various voltage potentials used during the operation of memory array 145. In general, the amplitude, shape, or duration of an applied voltage discussed herein may be adjusted or varied and may be different for the various operations for operating memory array 145. Furthermore, one or multiple sets of memory cells 105 within memory array 145 may be accessed simultaneously; for example, multiple (or all) sets of cells of memory array 145 may be accessed simultaneously during a reset operation in which all memory cells 105, or a set of memory cells 105, are set to a single logic state.

Although the techniques disclosed herein are described with reference to floating gate memory cells, the techniques may be implemented using other types of cells that store logic states, such as charge trap memory cells. Other examples of memory cells supporting the self-controlled refresh in accordance with various embodiments of the present disclosure may include ferroelectric memory cells (FeRAM), phase-change memory cells (PCM), chalcogenide-based memory cells (either with memory element and select device or with a sole element acting both as selecting device and memory storage element), among others.

Figure 2:
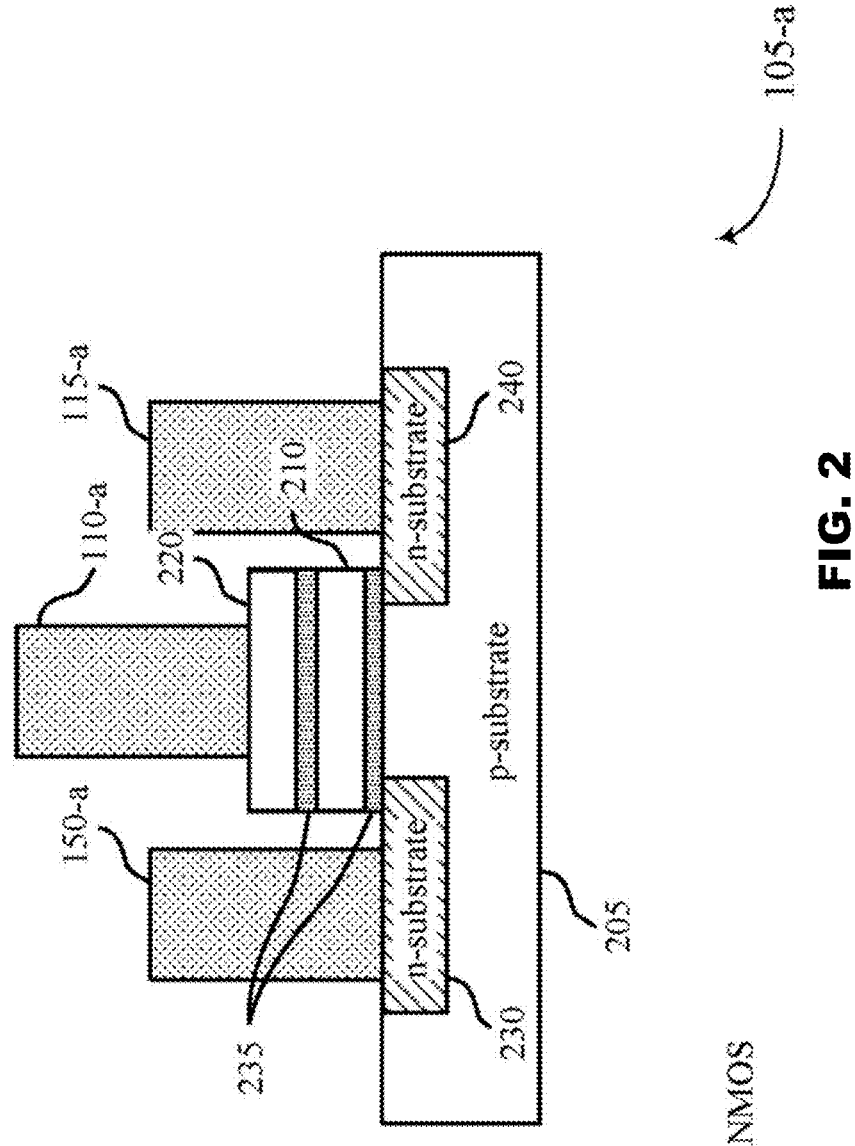
FIG. 2 illustrates an example of a memory cell that supports the self-controlled refresh in accordance with an embodiment of the present disclosure.

FIG. 2 illustrates an example of a memory cell 105-a that supports the self-controlled refresh in accordance with various embodiments of the present disclosure. Memory cell 105-a may be an example of a memory 105 described with reference to FIG. 1. Memory cell 105-a may include a floating gate transistor (e.g., an FGMOS), which may be similar to a conventional transistor and may include an additional electrode between the gate and the semiconductor.

Memory cell 105-a may be an example of a memory cell used in flash memory architecture that is used to store a bit of information. Memory cell 105-a may be susceptible to errors. For example, memory cell 105-a may experience a phenomenon, referred to herein as bit flipping, in which a stored bit is reversed (e.g., a stored logic 1 becomes a logic 0 or vice versa). Bit flipping may be the result of drifting effects in which the voltage level, or charge, stored by memory cell 105-a slowly drifts from its initial value. Bit flipping may also result from over-programming effects in which a programming operation for a set of memory cells 105 inadvertently flips the bit on memory cell 105-a. In some cases, bit flipping may result from read-disturb errors in which a read operation for a set of memory cells 105 induces a permanent change of a bit value of one of the sensed memory cells 105 (e.g., memory cell 105-a).

Memory cell 105-a may include source line 150-a, word line 110-a, and digit line 115-a. Word line 110-a may be connected to control gate 220 (e.g., control gate 220 may be accessed via word line 110-a), source line 150-a may be connected to source 230 (e.g., source 230 may be accessed via source line 150-a) and digit line 115-a may be connected to drain 240 (e.g., drain 240 may be accessed by digit line 115-a). Control gate 220 may include an electrode. In the example depicted in FIG. 2, source 230 and drain 240 comprise an n-substrate surrounded by a p-substrate semiconductor 205 (e.g., memory cell 105-a may be an NMOS transistor). In alternative examples, source 230 and drain 240 may comprise a p-substrate surrounded by an n-substrate semiconductor (e.g., memory cell 105-a may comprise a PMOS transistor). When the control gate 220 is biased so that the control gate 220 discharges, a conductive channel may be formed between source 230 and drain 240, allowing current to flow through memory cell 105-a (e.g., from the source 230 to the drain 240). When the control gate 220 is biased so that charge accumulates on the control gate 220, the conductive channel may be restricted so that current does not flow between the source 230 and the drain 240.

Memory cell 105-a may also include a floating gate 210 (e.g., an electrode) between the control gate 220 and the p-substrate semiconductor 205. The floating gate 210 may be isolated from other portions of memory cell 105-a by insulators 235. Insulators 235 may be made of an insulating material, such as an oxide (e.g., metal oxide, silicon oxide, etc.). When memory cell 105-a is properly biased, current may flow through memory cell 105-a (e.g., through a channel between the source 230 and the drain 240). When a sufficiently high current is passed through memory cell 105, electrons flowing through the channel (e.g., from the source 230 to the drain 240) may gain enough kinetic energy to travel through (e.g., via hot-carrier injection) the insulators 235 and accumulate on the floating gate 210. Thus, the floating gate 210 may acquire a negative charge.

The charge on floating gate 210 may remain on the floating gate 210 when power (e.g., a voltage bias) has been removed from memory cell 105 and may indicate a binary state. That is, memory cell 105-a may retain a particular state even when powered down. The charge state of floating gate 210 may be used to represent one bit of data. For example, the presence of charge on the floating gate 210 may indicate a first logic state (e.g., a logic 0) and the absence of charge on the floating gate 210 may indicate a second logic state (e.g., a logic 1). The process of writing or storing a logic 0 at a memory cell 105 may be referred to herein as programming the memory cell 105. The process of writing or storing a logic 1 at a memory cell 105 may be referred to herein as erasing the memory cell 105.

The presence of charge, or lack thereof, on the floating gate 210 may affect the behavior and/or characteristics (e.g., the threshold voltage) of memory cell 105-a. If the floating gate 210 is not charged (e.g., if floating gate 210 has a neutral charge, which corresponds to a logic 1), then memory cell 105-a may operate almost like a conventional transistor. That is, a positive voltage bias applied to the control gate 220 may create a conductive channel in p-substrate substrate 205 that carries a current from the source 230 to the drain 240. If the floating gate 210 is charged (e.g., negatively charged, which corresponds to a stored logic 0) and a positive voltage is applied to the control gate 220, the charge on the floating gate 210 may shield the channel region from the control gate 220 and prevent the formation of a channel between the source 230 and the drain 240, thereby limiting the amount of current flowing through memory cell 105-a. Thus, more current may flow through memory cell 105-a when memory cell 105-a stores a logic 1 (e.g., the floating gate is neutral) than when memory cell 105-a stores a logic 0 (e.g., the floating gate is negative).

As mentioned above, other memory cell types may be used according to various embodiments, including FeRAMs, PCMs and/or chalcogenide-based memory cells, for example. Without going into the details of the functioning of each memory cell type, some principles of information storage in these memory cells are here recalled. Information is normally stored in FeRAM memory cells modifying a polarization charge of a ferroelectric material in a capacitor. Information is normally stored in a PCM memory cell modifying the micro-structural phase of a phase-change material between a substantially crystalline state and a substantially amorphous state; the resistance of the memory cell is correspondingly modified from low (crystalline) to high (amorphous). Chalcogenide-based memory cells of the self-selecting type, e.g., featuring a sole chalcogenide material acting both as memory storage element and selector device, may be programmed in different states using pulses of different polarities, in some examples; electrical parameters, such as a threshold voltage for no or low current to high current conduction are correspondingly modified, allowing for read-out of the information stored therein. The present disclosure applies, but it is not limited, to all such memory cells.

Figure 3:
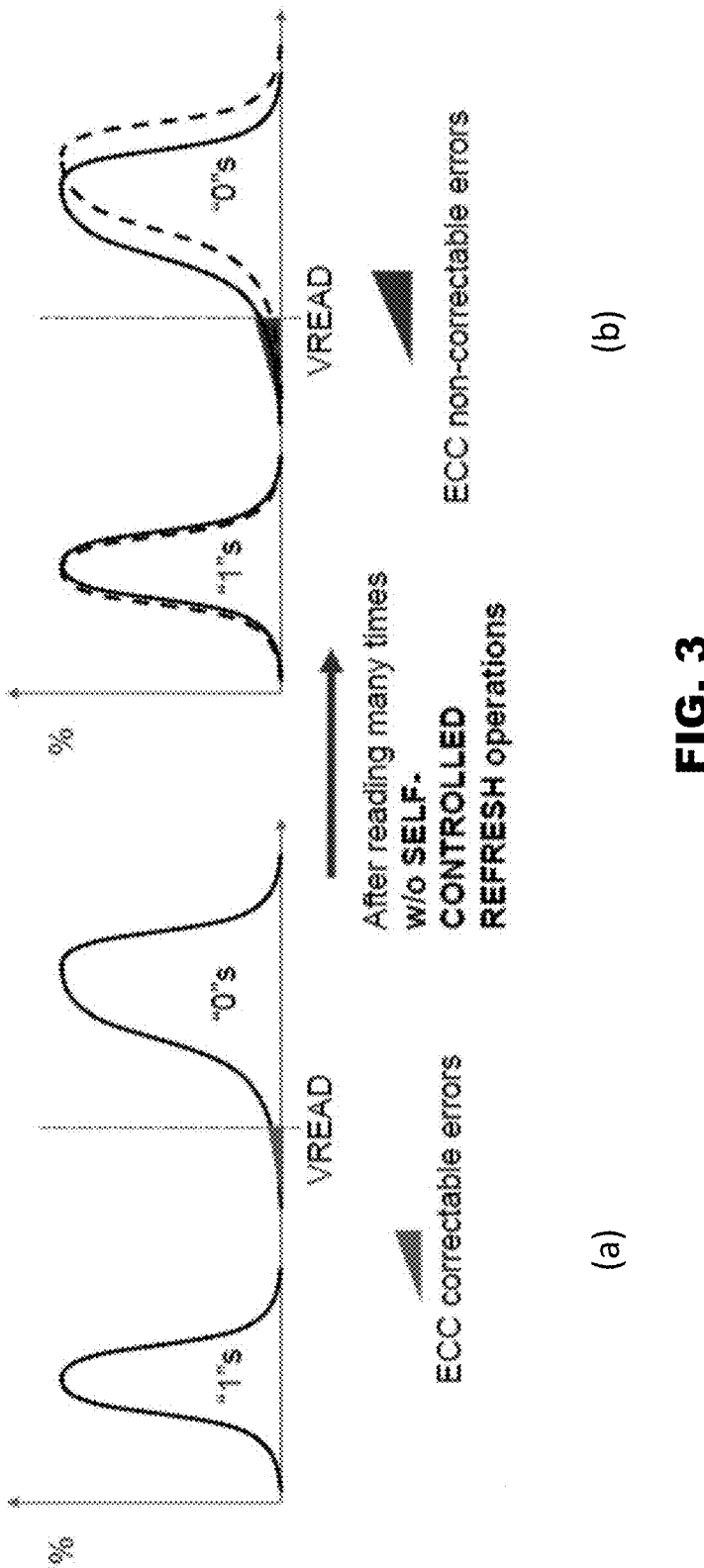
FIG. 3 is a diagram illustrating an example read of memory cells without the self-controlled refresh operations in accordance with an embodiment of the present disclosure.

FIG. 3 is a diagram illustrating an example read of memory cells 105 without the self-controlled refresh operations in accordance with an embodiment of the present disclosure.

FIG. 3 (a) and FIG. 3 (b) schematically depict distribution of memory cells in the different states (e.g., state "1" and state "0" as function of a reading parameter). The vertical axis represents the percentage (%) of memory cells and the horizontal axis represents the reading parameter that can be a reading voltage, for example, as depicted in FIG. 3 (similar reasoning may be done using a different reading parameter, such as a reading current, for example-not shown).

In FIG. 3(a) and FIG. 3(b) a first distribution is present on the left-side, e.g., at voltages lower than a read voltage VREAD. This distribution corresponds to memory cells previously programmed in the logic state "1". In FIG. 3(a) a second distribution is present on the right-side, e.g., at voltages proximate to and higher than a read voltage VREAD. This distribution corresponds to memory cells previously programmed in the logic state "0".

As it can be appreciated, some of the memory cells programmed in the logic state "0" may end-up with having a reading voltage lower than VREAD (e.g., those cells highlighted in blue in FIG. 3(a) and labeled as ECC correctable errors). Correspondingly, when read with the read voltage VREAD, these cells fail to give back the correct information. There may be several reasons for this to happen; just to provide an example in case of a floating gate memory cell as described with reference to FIG. 2, a charge los from the floating gate would result in a lower threshold voltage of the memory cell. Until the number of nominally "0" memory cells that are instead read as "1" memory cells (e.g., the number of failing memory cells) can be corrected by the ECC engine, the correct data may be obtained. However, the number of failing memory cells (e.g., those depicted by the red portion of "0" distribution on the right hand-side of FIG. 3(b) and labeled ECC non-correctable errors) may exceed a correction capability of the ECC engine, in which case a read error will occur. It should be noted that, despite the description above refers to memory cells programmed to the logic state "0" failing and being read as cells programmed at "1", the opposite may occur, in other embodiments. As it will be understood, the solution here described is also suitable to that situation and is not limited with this respect.

So, in general, as shown in FIG. 3(a), when reading data from memory cells 105, errors in the data can be corrected by ECC. The error rate may increase after reading many times. As a result, non-correctable errors may occur in the data read from the memory cells 105, which may adversely affect the correct read of the memory cells 105.

Figure 4:
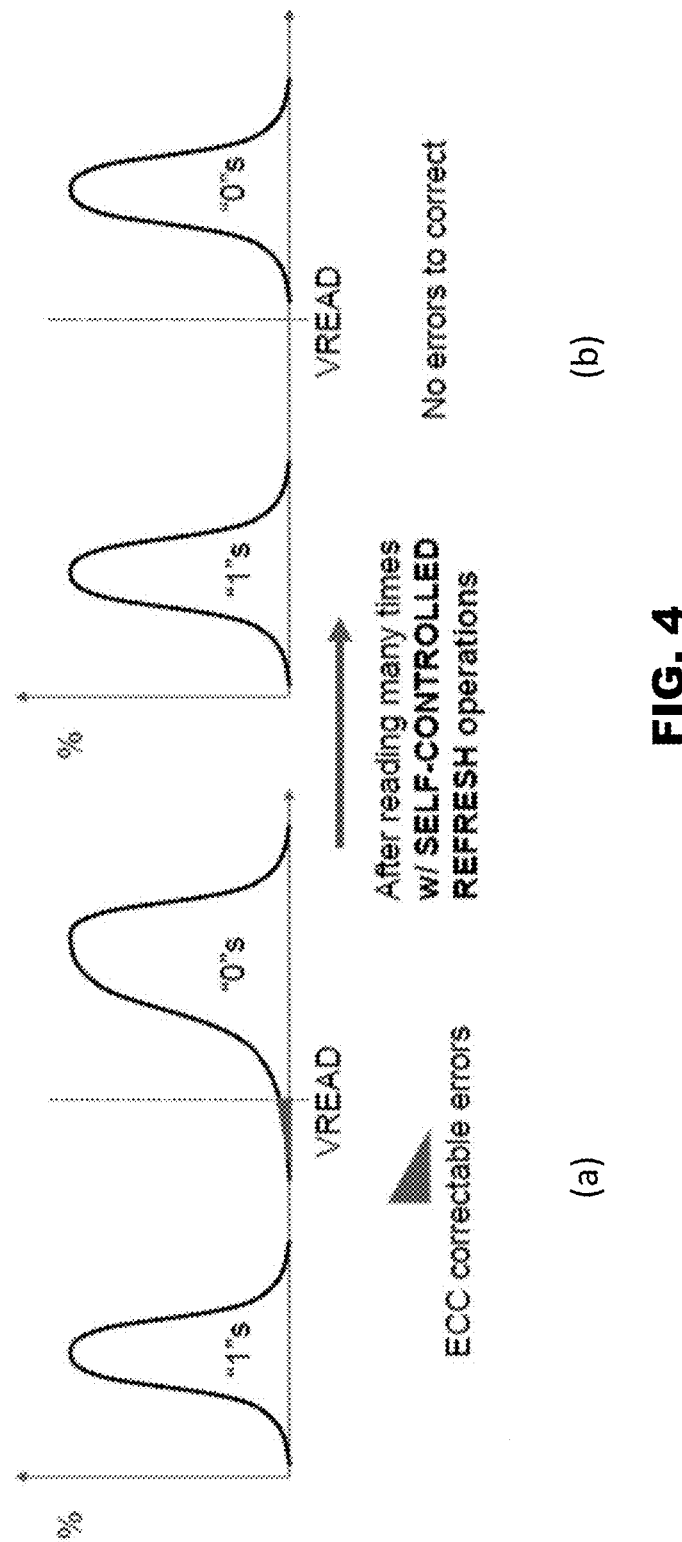
FIG. 4 is a diagram illustrating an example read of memory cells with the self-controlled refresh operations in accordance with an embodiment of the present disclosure.

According to the techniques described herein, the above problem can be avoided with the self-controlled refresh. FIG. 4 is a diagram illustrating an example read of memory cells 105 with the self-controlled refresh operations in accordance with an embodiment of the present disclosure.

Distributions of memory cells programmed at logic state "1" (left) and logic state "0" right are shown in FIG. 4 similarly as in FIG. 3, and therefore the description will not be repeated here for conciseness. FIG. 4(a) correspond to a starting point similar to that depicted in FIG. 3(a), e.g., with a limited number of failing memory cells resulting in ECC correctable errors. FIG. 4(b) depicts distributions at a subsequent time, after having applied the self-controlled refresh described herein. It will be appreciated that the distributions of cells programmed at "1" and cells programmed at "0" are both correctly read and there are no errors.

It can be seen from the comparison between FIG. 4(a) and FIG. 4(b), although the memory cells 105 have been read for many times, the correct read of the memory cells 105 can be guaranteed with employing the self-controlled refresh operations.

Figure 5:
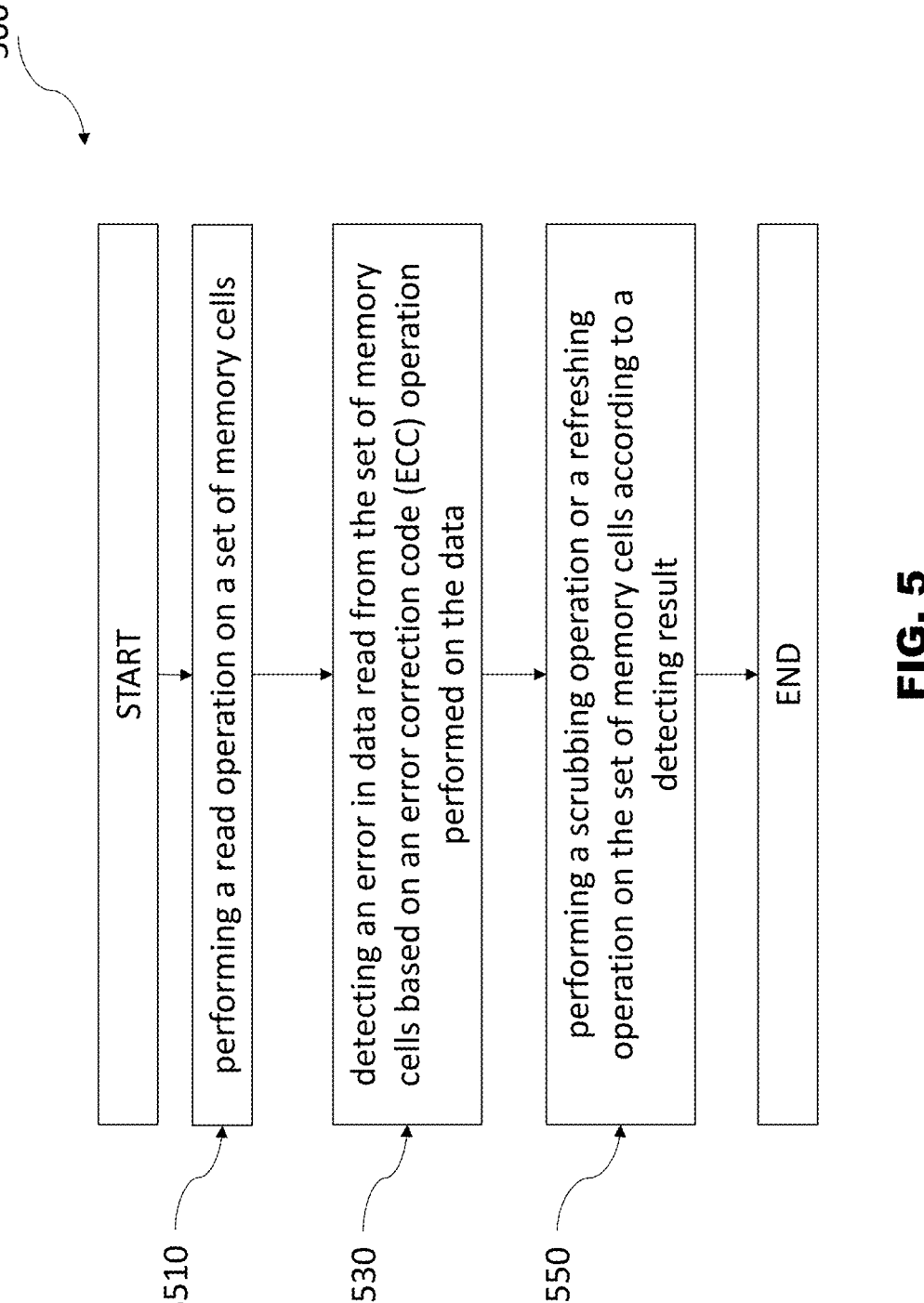
FIG. 5 is a flowchart illustrating a method for the self-controlled refresh in accordance with an embodiment of the present disclosure.

The following will be dedicated to the method of self-controlled refresh. FIG. 5 is a flowchart 500 illustrating a method for the self-controlled refresh of the memory cells 105 in accordance with an embodiment of the present disclosure. The operations of method 500 may be implemented by one or more controllers associated with the memory cells 105. In some examples, one or more controllers may execute a set of instructions to control one or more functional elements to perform the described functions. Additionally or alternatively, one or more controllers may perform aspects of the described functions using special-purpose hardware.

At S510, the method 500 may include performing a read operation on a set of memory cells 105. The operations of S510 may be performed according to the method described herein.

In one embodiment, a controller may include a command/data processor which is configured to receive a read command from a host and transmit the read command to the memory device.

At S530, the method 500 may include detecting an error in data read from the set of memory cells 105 based on an error correction code (ECC) operation performed on the data. The operations of S530 may be performed according to the method described herein.

In one embodiment, the set of memory cells 105 may be sensed and the corresponding bits may form a data block (or string). For example, a block of data may include the bits from a number of memory cells 105. In some cases, certain operating conditions may degrade or alter the stored state of one or more memory cells 105, which may result in one or more errors during sensing of the memory cells 105. For example, the materials making up the memory cells 105 may deteriorate or neighboring memory cells 105 may disrupt an access operation. To prevent undetected errors, redundancy may be added to blocks of data. For instance, an error correction code (ECC) (e.g., a block code or a convolution code) may be used to encode stored data in such a way that a decoder can identify and, in some cases, correct errors in a data block. When a block of data bits is encoded using ECC, the resulting string of data bits may be referred to as a codeword. A codeword may include multiple bytes. The process of encoding may occur during the write process.

When a codeword is constructed (e.g., identified) from a read operation of a set of memory cells 105, the codeword may be evaluated to determine if an error has occurred. For example, an ECC operation (e.g., ECC decoding) may be performed on the read codeword, and the result of the ECC operation may indicate whether the codeword is error-free or contains an error.

At S550, the method 500 may include performing a scrubbing operation or a refreshing operation on the set of memory cells 105 according to a detecting result. The operations of S550 may be performed according to the method described herein.

In one embodiment, the scrubbing operation may be performed on the set of memory cells 105 when the error is detected. Memory scrubbing may comprise reading the memory, correcting any possible error (for example using an ECC) and reprogramming the memory with the correct data. As a non-limiting example, with reference to FIG. 4(a), when ECC correctable errors are detected during a read operation, the set of memory cells may be reprogrammed with the correct data. Possible cumulation of errors with time may therefore be avoided. In an alternate embodiment, the refreshing operation may be performed on the set of memory cells 105 when no error is detected. Refreshing may comprise reinforcing the data read from the memory. In an example, refreshing may comprise overwriting the read data into the set of memory cells 105, even if no error was detected. Possible arising of new errors is therefore prevented. Overwriting may involve overwriting at least one of the logic states; in some cases, it may involve overwriting both logic states.

In one embodiment, the set of memory cells 105 may be scrubbed to correct the error. An error threshold at which the set of memory cells is scrubbed is selectable based on a margin desired with respect to a correction power of an ECC engine performing the ECC operation.

In an alternate embodiment, when there is no error detected in the set of memory cells 105, the set of memory cells 105 may be blindly refreshed on a pseudo-random basis to prevent a future read error on the same set of memory cells 105. In some embodiments, when there is no error in the set of memory cells 105, the set of memory cells may be refreshed on a periodic basis. This may be useful to prevent a future read error on the same set of memory cells 105. A read access counter may be used to count the number of read accesses and periodically, based on reaching a threshold value of read accesses, a blind refresh of the set of memory cells 105 is performed; as a non-limiting example, a blind refresh is performed in one out of 32 read accesses to a bank. Alternatively or additionally, a time counter may be used to measure lapsed time from a previous read access operation and periodically, based on reaching a threshold value of the time counter, a blind refresh of the set of memory cells 105 is performed at the subsequent access operation.

In one embodiment, an additional time required to scrub (to correct existing errors) or refresh (to prevent future errors) the memory cells 105 may be always necessary without impacting the read latency time, but only the read completion time, which represents the time between read commands on the same bank. An additional power consumption may be only necessary when the self-controlled refresh actually executes the scrubbing or pseudo-random refreshing operation.

Figure 6:
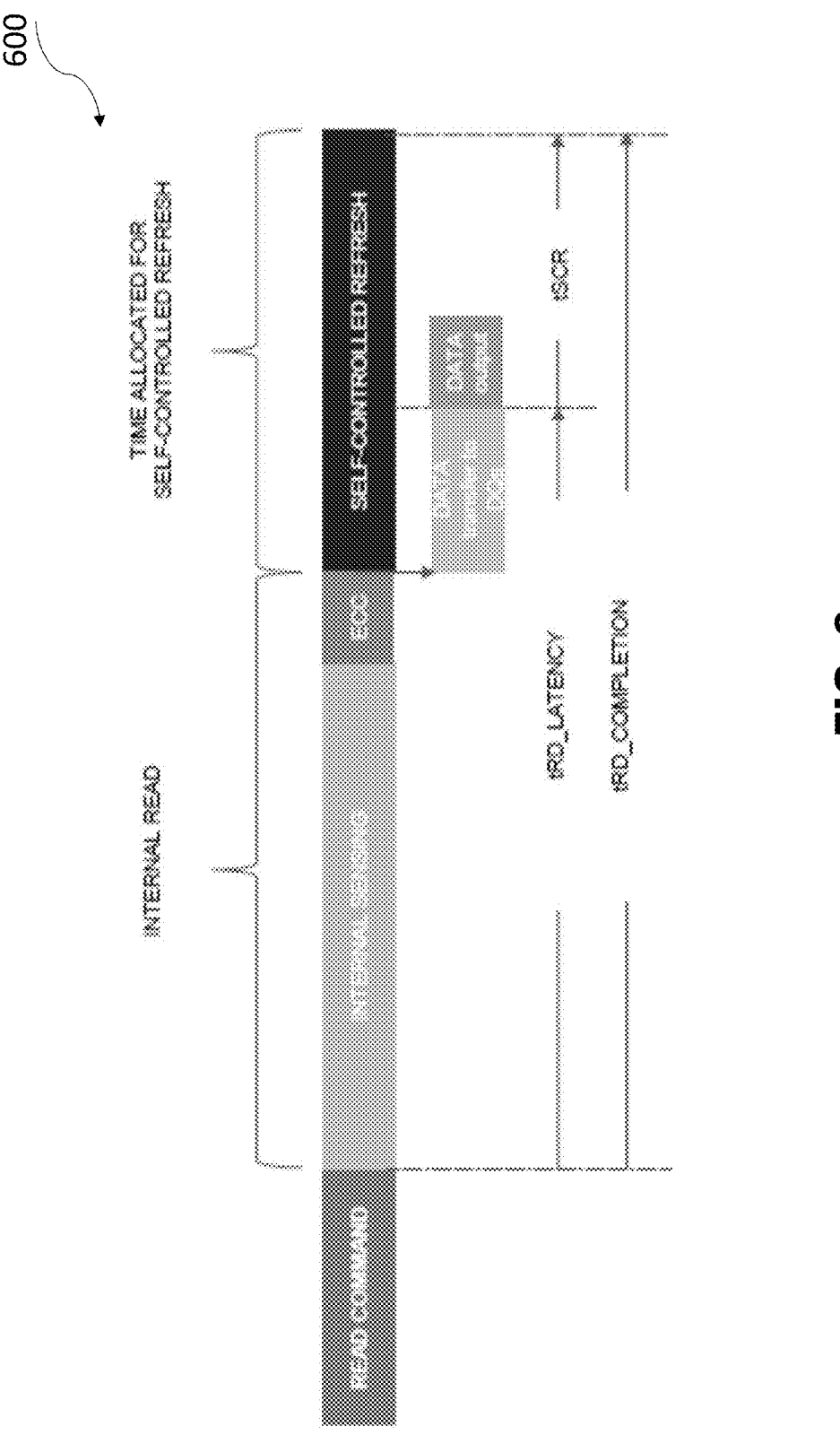
FIG. 6 is a diagram illustrating a time allocation for a read of memory cells with the self-controlled refresh in accordance with an embodiment of the present disclosure.

FIG. 6 is a diagram 600 illustrating a time allocation for a read of memory cells 105 with the self-controlled refresh in accordance with an embodiment of the present disclosure.

When receiving a read command, an internal read may be performed firstly on the memory cells 105, which may include at least an internal sensing operation and an ECC operation. Afterwards, the self-controlled refresh may be performed on the memory cells 105 according to the result of the ECC operation. In some embodiments, data transfer to DQ pads (e.g., input/output terminals) may be initiated at completion of ECC detection/correction, substantially in parallel with self-controlled refresh. The data may be output after tRD_LATENCY. Data output timing is not affected by the self-controlled refresh operation. As shown in FIG. 6, tSCR is an additional time allocated for the self-controlled refresh (scrub or pseudo-random refresh) operation, but the actual start could be after the time allocated for ECC detection and a possible ECC correction.

Figure 7:
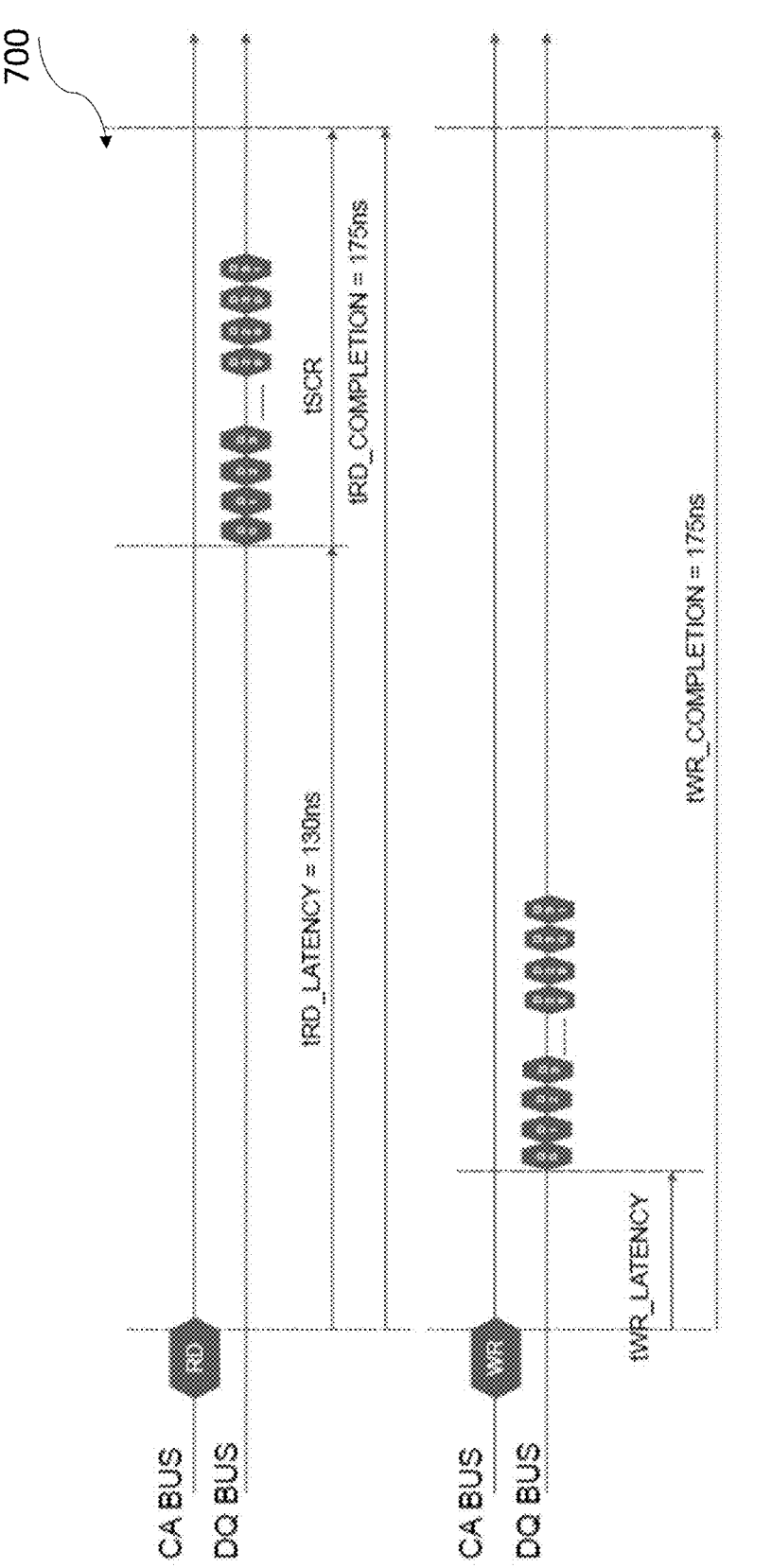
FIGS. 7 and 8 are diagrams illustrating read and write bus signals of the memory cells in accordance with an embodiment of the present disclosure.
Figure 8:
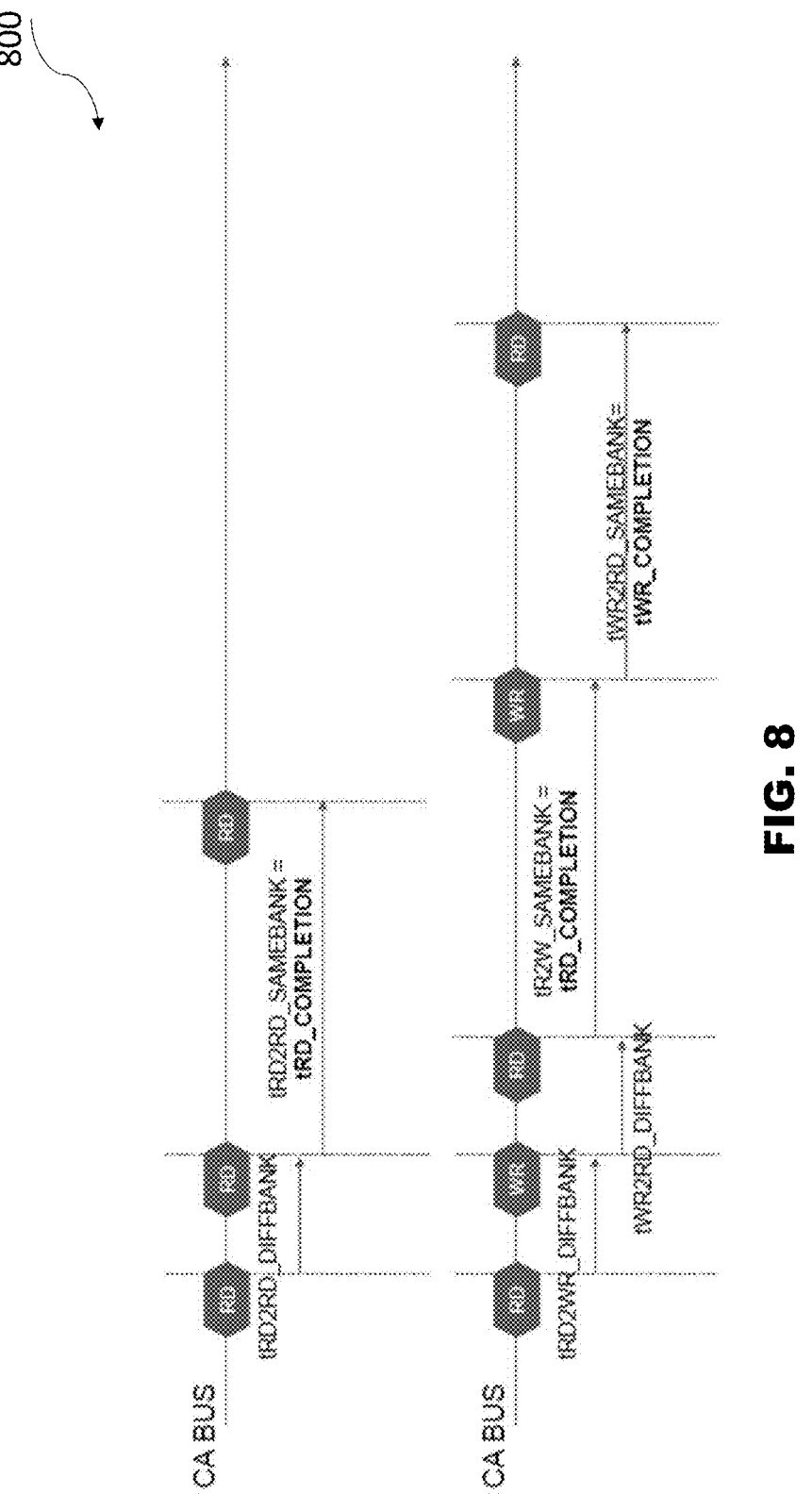

FIGS. 7 and 8 are diagrams 700 and 800 illustrating CA and DQ bus signals of the memory component 100 in accordance with an embodiment of the present disclosure.

FIG. 7 shows that (top) data bits (D0, . . . , D31) are available on the DQ bus a time tRD_LATENCY after a read command (RD) on the CA bus, during a tScR interval. The total duration of the read operation is tRD_COMPLETION. FIG. 7 also shows that (bottom) data bits (D0, . . . , D31) can be presented on the DQ bus a time tWR_LATENCY after a write command (WR) on the CA bus. The total duration of the write operation is tRD_COMPLETION.

FIG. 8 shows CA bus signals for subsequent access in read (top) and read/write (bottom) to a different partition or bank. With reference to FIG. 8 (top), while a read command on a different bank than a first read command may be issued after a period tRD2RD_DIFFBANK, a further subsequent read command on the same bank nan be issued after a period tRD2RD_SAMEBANK, that corresponds to tRD_COMPLETION. With reference to FIG. 8 (bottom), a write command on a different bank than a first read command may be issued after a period tRD2WR_DIFFBANK; a subsequent read command on a different bank may be issued after an interval tWR2RD_DIFFBANK; a subsequent write command on the same bank may be issued after a period tRD2WR_SAMEBANK, that corresponds to tRD_COMPLETION; and a further subsequent read command on the same bank may be issued after a period tWR2RD_SAMEBANK, that corresponds to tWR_COMPLETION.

Embodiments of FIGS. 7 and 8 are used to highlight that data (D0, . . . , D31) can now be-written to the same partition, e.g., on the same bank, only after the internal operation has ended, that is, only after completion. This may allow a new access on the same partition when the operation is completed. The tRD_COMPLETION may be equal to 175 ns, which is only an example and may be 200 ns or more, as soon as the internal read has been performed. However, access to a different partition is allowed without need to wait for internal operation. According to the embodiments of the present disclosure, a low latency in read can be guaranteed, for example, 130 ns.

Figure 9:
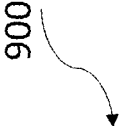
FIG. 9 is a diagram illustrating a system, including a memory component, that supports the self-controlled refresh in accordance with an embodiment of the present disclosure.
Figure 9:
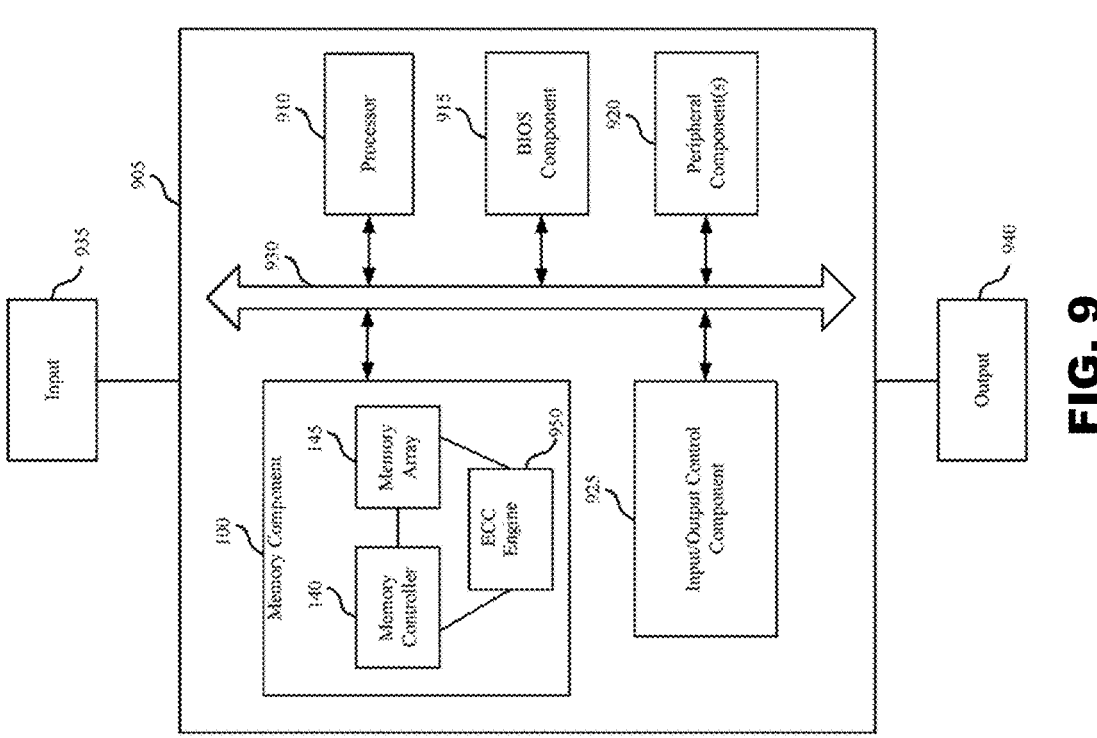

FIG. 9 is a diagram illustrating a system 900, including a memory component, that supports the self-controlled refresh in accordance with an embodiment of the present disclosure.

System 900 includes a device 905, which may be or include a printed circuit board to connect or physically support various components. Device 905 may also be referred to as an electronic memory apparatus. Device 905 includes a memory component 100, which may be an example of memory component described with reference to FIG. 1. Memory component 100 may include memory controller 140, ECC engine 950, and memory array 145. Device 905 may also include a processor 910, BIOS component 915, peripheral component(s) 920, and input/output control component 925. Device 905 may include other components (not shown). The components of device 905 may be in electronic communication with one another through bus 930.

In one embodiment, the memory controller 140 may be operable to cause the memory apparatus 905 to perform a read operation on a set of memory cells of the memory array 145, detect an error in data read from the set of memory cells based on an error correction code (ECC) operation performed on the data by the ECC engine 950, and perform a scrubbing operation or a refreshing operation on the set of memory cells according to a detecting result.

In one embodiment, the scrubbing operation may be performed on the set of memory cells when the error is detected. In an alternate embodiment, the refreshing operation may be performed on the set of memory cells when no error is detected.

In one embodiment, the set of memory cells may be scrubbed to correct the error. An error threshold at which the set of memory cells is scrubbed is selectable based on a margin desired with respect to a correction power of the ECC engine.

In an alternate embodiment, when there is no error detected in the set of memory cells, the set of memory cells may be blindly refreshed on a pseudo-random basis to prevent a future read error on the same set of memory cells. In some embodiments, when there is no error in the set of memory cells 105, the set of memory cells may be refreshed on a periodic basis. This may be useful to prevent a future read error on the same set of memory cells 105. A read access counter may be used to count the number of read accesses and periodically, based on reaching a threshold value of read accesses, a blind refresh of the set of memory cells 105 is performed; as a non-limiting example, a blind refresh is performed in one out of 32 read accesses to a bank. Alternatively or additionally, a time counter may be used to measure lapsed time from a previous read access operation and periodically, based on reaching a threshold value of the time counter, a blind refresh of the set of memory cells 105 is performed at the subsequent access operation.

Processor 910 may be configured to operate memory component 100 through memory controller 140. Processor

910 may be configured or controlled via input 935. In some cases, processor 910 may perform the functions of memory controller 140 described with reference to FIG. 1. In other cases, memory controller 140 may be integrated into processor 910. Processor 910 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components, and processor 910 may perform various functions described herein. Processor 910 may, for example, be configured to execute computer-readable instructions to cause device 905 perform various functions or tasks.

BIOS component 915 may be a software component that includes a basic input/output system (BIOS) operated as firmware, which may initialize and run various hardware components of system 900. BIOS component 915 may also manage data flow between processor 910 and the various components, e.g., peripheral components 920, input/output control component 925, etc. BIOS component 915 may include a program or software stored in read-only memory (ROM), flash memory, or any other non-volatile memory.

Peripheral component(s) 920 may be any input or output device or system, or an interface for such devices and systems, that is integrated into device 905. Examples may include disk controllers, sound controller, graphics controller, Ethernet controller, modem, universal serial bus (USB) controller, a serial or parallel port, or peripheral card slots, such as peripheral component interconnect (PCI) or accelerated graphics port (AGP) slots.

Input/output control component 925 may manage data communication between processor 910 and peripheral component(s) 920, input devices 935, or output devices 940. Input/output control component 925 may also manage peripherals not integrated into device 905. In some cases, input/output control component 925 may represent a physical connection or port to the external peripheral.

Input 935 may represent a device or signal external to device 905 that provides input to device 905 or its components. This may include a user interface or interface with or between other devices. In some cases, input 935 may be a peripheral that interfaces with device 905 via peripheral component(s) 920 or may be managed by input/output control component 925.

Output 940 may represent a device or signal external to device 905 configured to receive output from device 905 or any of its components. Examples of output 940 may include a display, audio speakers, a printing device, another processor or printed circuit board, etc. In some cases, output 940 may be a peripheral that interfaces with device 905 via peripheral component(s) 920 or may be managed by input/output control component 925.

The components of memory controller 140, device 905, and memory array 145 may be made up of circuitry designed to carry out their functions. This may include various circuit elements, for example, conductive lines, transistors, capacitors, inductors, resistors, amplifiers, or other active or inactive elements, configured to carry out the functions described herein.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The terms "example," "exemplary," and "embodiment," as used herein, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. When the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The term "electronic communication" refers to a relationship between components that supports electron flow between the components. This may include a direct connection between components or may include intermediate components. Components in electronic communication may be actively exchanging electrons or signals (e.g., in an energized circuit) or may not be actively exchanging electrons or signals (e.g., in a de-energized circuit) but may be configured and operable to exchange electrons or signals upon a circuit being energized. By way of example, two components physically connected via a switch (e.g., a transistor) are in electronic communication regardless of the state of the switch (i.e., open or closed).

The devices discussed herein, including memory array 145, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A transistor or transistors discussed herein may represent a field-effect transistor (FET) and comprise a three terminal device that includes a source, drain, and gate. Alternatively, the transistor or transistors may represent a floating gate metal-oxide-transistor (FGMOS) and comprise a three terminal device that includes a source, drain, control gate, and floating gate. The transistor terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the transistor may be referred to as a n-type transistor. If the channel is p-type (i.e., majority carriers are holes), then the transistor may be referred to as a p-type transistor. The channel may be capped by an insulating gate oxide. The channel conductivity may be controlled by applying a voltage to the gate. For example, applying a positive voltage or negative voltage to an n-type transistor or a p-type transistor, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The various illustrative blocks, components, and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital sub-scriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The invention claimed is:

1. A method for operating a memory apparatus, comprising:

receiving a read command in the memory apparatus having a set of memory cells; and responsive to the read command received in the memory apparatus:

performing, by the memory apparatus, a read operation on the set of memory cells;

detecting, by the memory apparatus, an error in data read from the set of memory cells based on an error correction code (ECC) operation performed on the data; and performing, by the memory apparatus responsive to the read command, a further operation on the set of memory cells according to a detecting result respon-sive to the read operation, wherein the further opera-tion is performed following the ECC operation and performed at least in part before end of transmission of a response to the read command.

2. The method of claim 1, wherein the further operation is a scrubbing operation performed on the set of memory cells when the error is detected.

3. The method of claim 2, wherein the set of memory cells is scrubbed to correct the error.

4. The method of claim 3, wherein an error threshold at which the set of memory cells is scrubbed is selectable based on a margin desired with respect to a correction power of an ECC engine performing the ECC operation.

5. The method of claim 1, wherein the further operation is a refreshing operation performed on the set of memory cells when no error is detected.

6. The method of claim 5, wherein the set of memory cells is blindly refreshed on a pseudo-random basis.

7. The method of claim 6, wherein the set of memory cells is blindly refreshed on a periodic basis.

8. A memory apparatus, comprising:

a memory array comprising memory cells;

an error correction code (ECC) engine in electronic communication with the memory array;

a memory controller in electronic communication with the ECC engine, the memory controller operable to cause, in response to a read command, the memory apparatus to:

perform a read operation on a set of memory cells;

detect an error in data read from the set of memory cells based on an error correction code (ECC) operation performed on the data by the ECC engine; and perform a further operation on the set of memory cells according to a detecting result responsive to the read operation, wherein at least a portion of the further operation is performed in parallel with transmission of a response to the read command over a data bus.

9. The memory apparatus of claim 8, wherein the further operation is a scrubbing operation performed on the set of memory cells when the error is detected.

10. The memory apparatus of claim 9, wherein the set of memory cells is scrubbed to correct the error.

11. The memory apparatus of claim 10, wherein an error threshold at which the set of memory cells is scrubbed is selectable based on a margin desired with respect to a correction power of the ECC engine.

12. The memory apparatus of claim 8, wherein the further operation is a refreshing operation performed on the set of memory cells when no error is detected.

13. The memory apparatus of claim 12, wherein the set of memory cells is blindly refreshed on a pseudo-random basis to prevent a future read error on the same set of memory cells.

14. The memory apparatus of claim 12, wherein the set of memory cells is blindly refreshed on a periodic basis.

15. A memory apparatus, comprising:

a memory array comprising memory cells and operable to perform a read operation on a set of memory cells in response to a read command;

an error correction code (ECC) engine coupled with the memory array and operable to detect an error in data read from the set of memory cells based on an ECC operation performed on the data; and circuitry coupled with the ECC engine and operable to perform, in response to the read command, a further operation on the set of memory cells according to a detecting result responsive to the read operation, wherein the further operation is performed following the ECC operation and performed at least in part before end of transmission of a response to the read command.

16. The memory apparatus of claim 15, wherein the further operation is a refreshing operation performed on the set of memory cells when no error is detected.

17. The memory apparatus of claim 15, wherein the further operation is a scrubbing operation performed on the set of memory cells when the error is detected.

18. The memory apparatus of claim 17, wherein the set of memory cells is scrubbed to correct the error.

19. The memory apparatus of claim 17, wherein an error threshold at which the set of memory cells is scrubbed is selectable based on a margin desired with respect to a correction power of the ECC engine.

20. The memory apparatus of claim 19, wherein the set of memory cells is blindly refreshed on a pseudo-random basis to prevent a future read error on the same set of memory cells.

21. The memory apparatus of claim 19, wherein the read command causes the memory apparatus to sense the set of memory cells in determination of the data read from the set of memory cells and transfer the data as the response to the read command; and the further operation is performed at least in part concurrently with the data being transferred from the memory apparatus as the response.

* * * * *